Aug. 12, 1930.    E. SØLVER    1,772,966
PISTON
Filed April 22, 1929    2 Sheets-Sheet 1
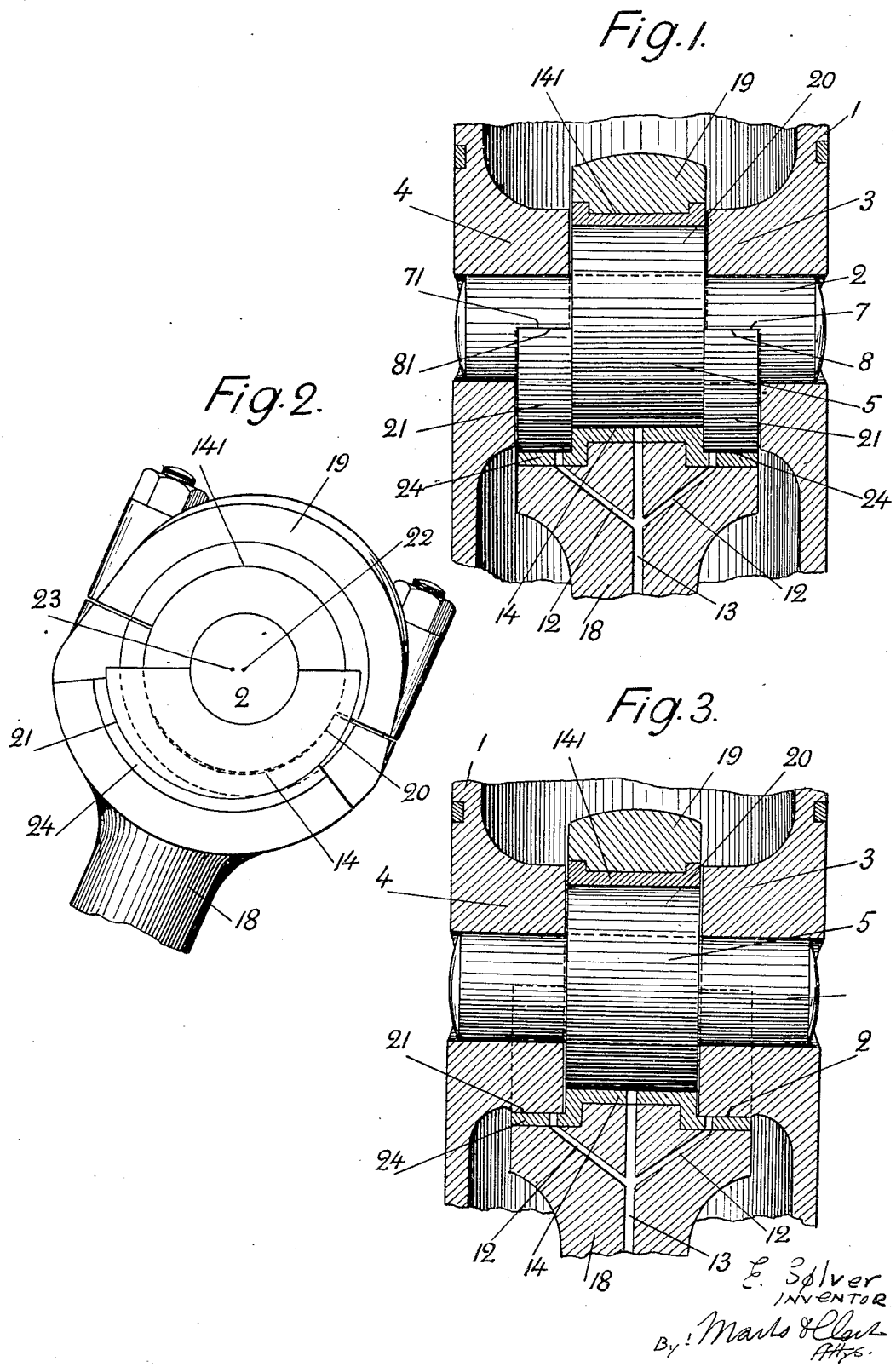

Aug. 12, 1930.       E. SØLVER       1,772,966
PISTON
Filed April 22, 1929    2 Sheets-Sheet 2
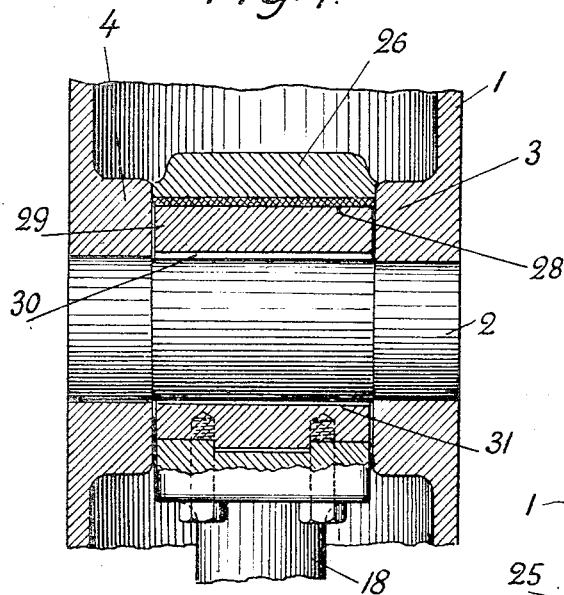
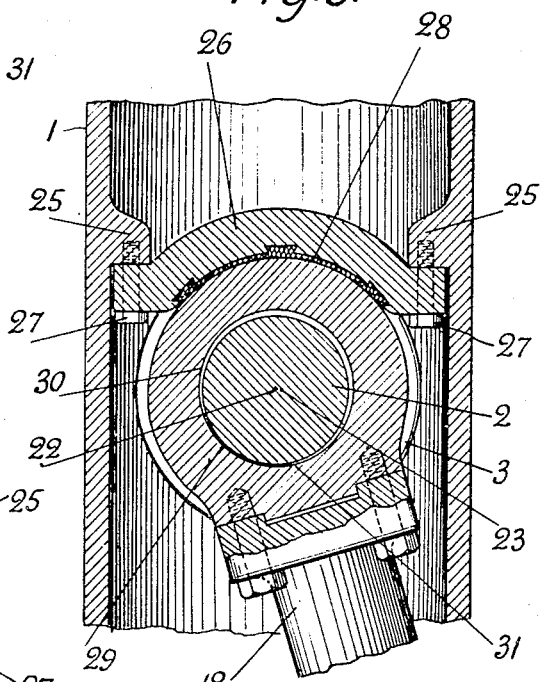
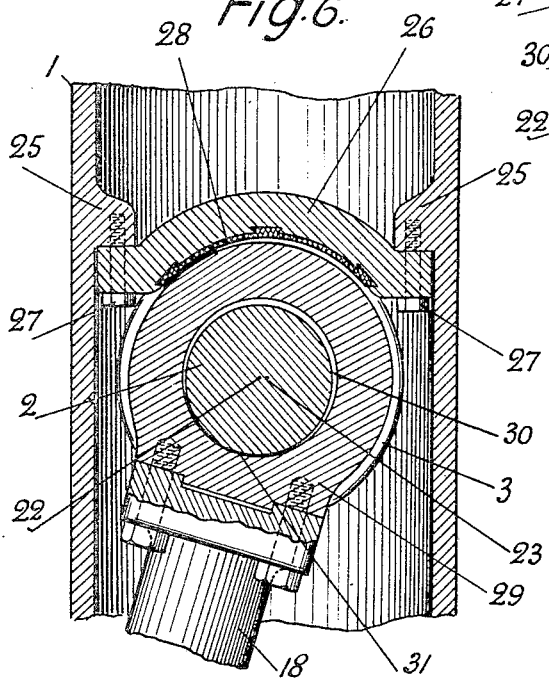

Patented Aug. 12, 1930

1,772,966

UNITED STATES PATENT OFFICE

EINAR SØLVER, OF HELLERUP, NEAR COPENHAGEN, DENMARK

PISTON

Application filed April 22, 1929, Serial No. 357,272, and in Denmark May 1, 1928.

This invention relates to an improvement in pistons, especially trunk pistons for two-stroke cycle internal combustion engines, and has for its object to provide for an advantageous connection between the piston and connecting rod, by which the lubrication of the coacting bearing surfaces is made so effective that the risk of overheating of the bearings or burning thereof becomes a minimum. In internal combustion engines working at high compression and combustion pressure it may be difficult to provide sufficient space in the piston for gudgeon pins the bearing surfaces of which are sufficiently great to keep the surface pressures below the limit where the film of lubricating medium, which must be present between the coacting surfaces, is broken. The breaking of this film makes the metallic bearing surfaces work directly upon each other, which may cause them to become overheated and to burn, this danger is especially pronounced in two-stroke internal combustion engines. In four-stroke engines the gas and inertia pressures vary, their change of direction taking place several times during each cycle, so that they tend alternately to press the piston down towards the connecting rod, and to lift it clear thereof. This changing of the direction of the pressures gives very favourable conditions to the lubrication, as alternately one and the other set of brasses of the small end of the connecting rod coacts with the gudgeon pin, while the inactive set is lifted clear, so that the lubricating medium has an easy access to the coacting surfaces. In two-stroke-engines the gas and inertia pressures act, on the contrary, normally in the same direction during the whole cycle, viz, so that the piston is continually pressed down towards the small end of the connecting rod. The conditions of an efficient lubrication are, therefore, much less favourable in two-stroke engines than in four-stroke engines. In several instances this drawback cannot even, as stated above, be done away with by making the diameter of the gudgeon pin so great as to bring the surface pressure down to the permissible value, the diameter of the cylinder limiting the space available in the piston so much that a sufficiently large gudgeon pin cannot be inserted. The invention overcomes the above mentioned deficiencies in a most practical manner, so that similar advantageous conditions are produced in two-stroke cycle engines as are inherent with four-stroke engines. According to the invention the piston and the connecting rod are, namely, provided with several sets of coacting cylindrical bearing surfaces so shaped or arranged relatively to each other that the brasses or bearing surfaces of the small end of the connecting rod bear alternately on varying cylindrical bearing surfaces of the piston. According to the invention the cylindrical bearing surfaces of the piston for the small end of the connecting rod are, nearer defined, so shaped that one set of bearing surfaces coacts when the connecting rod is swung out to one side, while the other set of bearing surfaces coact when the rod is swung out to the other side, it being obtained at the same time that the set of bearing surfaces being inactive at any moment is so separated as to give free access for the lubricant to the surfaces in question. The axes of some of the cylindrical bearing surfaces of the piston for the small end of the connecting rod, found e. g. on the gudgeon pin itself or on the bearings, are eccentrically placed, according to the invention, relatively to the axes of others of the said bearing surfaces. For example a gudgeon pin may be employed having several eccentrically placed cylindrical bearing surfaces or carrying a loosely mounted sleeve or the like having such surfaces but not being rotatable in relation to the piston. Further constructional forms of the invention will appear from the following specification. In the accompanying drawing Fig. 1 is a longitudinal section through parts of a piston and connecting rod according to the invention, Fig. 2 is an elevation of the small end of the connecting rod shown in Fig. 1, Fig. 3 is a section corresponding to Fig. 1 through another constructional form, Fig. 4 is a corresponding section through a third constructional form, and Figs. 5 and 6 are longitudinal sections perpendicular to Fig. 4 showing the connecting rod in two different positions. In Figs. 1 and 2, 1 denotes the piston, 2 the gudgeon pin, 3 and 4 its bosses, 18 the connecting rod, and 19 the small end thereof. 12 are lubricating passages communicating with the supply passage 13 of a pressure-lubricating system in the connecting rod. The gudgeon pin 2 carries a sleeve 5 provided with two sets of bearing surfaces 20 and 21, of which the bearing surface 20 is turned down cylindrical and co-axial with the central bore of the sleeve, while the bearing surfaces 21, which are likewise cylindrically turned surfaces, have their axes 23, Fig. 2, eccentrically displaced relatively to the axis 22 of the gudgeon pin. The axis 23 is displaced a certain distance horizontally and to the same side to which the connecting rod swings during the down stroke of the piston. The small end 19 of the connecting rod is provided with an upper brass 141 and a lower brass 14 and these two brasses bear on the bearing surface 20 on the sleeve, which they surround with a small clearance. Besides, there are in the small end 19 of the connecting rod two lower brasses 24 which bear upon the bearing surface 21 on the sleeve. The three lower brasses 24, 14, 24 may be in one piece as shown in the drawing. The sleeve 5 proper is stepped at both ends, so that flat surfaces 7, 71 are produced, these flat surfaces corresponding to the flats 8, 81 on the piston bosses 3, 4 and prevent rotation of the sleeve. The constructional form shown in Figs. 1 and 2 may be modified as shown in Fig. 3, so that instead of forming part of the sleeve 5 or of the gudgeon pin 2, as shown in Fig. 1, the eccentric bearing surfaces 21 may be integral with the bosses 3, 4, so that the bearing surfaces 14, 24 in the small end of the connecting rod bear alternately on the enlarged gudgeon pin or sleeve and on the eccentric bearing surfaces 21 forming parts of the pin bosses. The sleeve 5 shown in Figs. 2 and 3 may consist, if wanted, of several parts assembled around and fastened to the gudgeon pin. The pin 2 and the sleeve 5 may also be in one one piece, in which case special provisions must be made in order to make the insertion of the pin in the piston possible. The shown construction works as follows: During the down stroke of the piston, the connecting rod is supposed to swing out to the left (Fig. 2), which will cause the eccentric surfaces 21, 24 to bear on each other, so that during the down stroke the gudgeon pin bears on the surface 21 at the same time as the lower brass 14 is moved slightly away from the bearing surface 20 on the sleeve 5 or the pin 2 with the result that the lubricant gets circumferential access to the clearance produced hereby between the bearing surface 20 and the lower brass 14. At the same time the upper brass 141 and the bearing surface 20 will be brought together which, however, is of no importance, if only the upper brass 141 and the lower brass 14 enclose the bearing surface 20 with a sufficient amount of clearance to prevent the upper brass 141, owing to the swinging out of the connecting rod, from being pressed hard against the bearing surface 20, which would cause the sleeve 5 to jerk in the small end of the connecting rod and produce heating. During the upstroke of the piston, the connecting rod will swing out to the right in Fig. 2 and the eccentric bearing surfaces 21 will thereby be moved so much away from the lower brasses 24 that the lubricant gains access between these surfaces at the same time as the lower brass 14 of the small end of the connecting rod bears on the bearing surface 20 on the sleeve 5 or enlargement of the gudgeon pin 2. By using two sets of paired eccentric bearing surfaces the two sets of bearing surfaces 20, 21 of the pin alternately bear on their corresponding lower brasses 14 and 24, so that a separation is effected between those bearing surfaces and brasses where there is no contact at the critical moment, and thus free access is provided for the lubricant to the surfaces in question. That set of bearing surfaces bearing during the down stroke of the piston may preferably be essentially larger than that set of surfaces bearing during the upstroke of the piston, the greatest pressure occurring during the down stroke of the piston. In the constructional form shown in Figs. 4-6 the piston, gudgeon pin, bosses and connecting rod are denoted by 1, 2, 3, 4 and 18 respectively, as in Figs. 1-3. In the piston 1 there are two projections 25, the lower prepared surfaces of which form the rest of a brass 26 held together with the projections 25 by screws 27, the downward facing concave and cylindrical surface of the brass being lined with bearing metal and forming bearing surface for the small end 29 of the connecting rod. This surface 28 has its axis 23 displaced relatively to the axis 22 of the gudgeon pin 2. The small end 29 of the connecting rod, which is turned in on the upper portion of its outer cylindrical surface to the same radius as the bearing surface 28 of the brass 26, has a bore 30, the diameter of which is somewhat larger than that of the gudgeon pin 2. The lower portion of the bore 30 is turned out to the same radius as the gudgeon pin 2, this portion of the bore 30 forming a bearing surface 31 for the gudgeon pin 2.

In Fig. 5 is shown the position assumed by the connecting rod at a certain moment of the down stroke of the piston, during which motion—the working stroke—the piston is exposed to the highest pressures. The connecting rod swings out to one side, and owing to the mutual eccentricity of the bearing surface 28 of the upper brass and the gudgeon pin 2 the small end 29 of the connecting rod bears on the bearing surface 28, and at the same time a slight separation takes place between the gudgeon pin 2 and the bearing surface 31, so that an easy access of the lubrication medium to the coacting surfaces is made possible. Fig. 6 shows the situation during the upstroke of the piston. The connecting rod swings out to the opposite side and the bearing surface 31 bears now, owing to the eccentricity between the gudgeon pin 2 and the bearing surface 23 of the brass 26, on the gudgeon pin, whereby the small end 29 of the connecting rod is retracted from the bearing surface 28, so that the lubricating medium gets access to these surfaces. According to the fact that the pressure in the engine cylinder is smaller during the upstroke of the piston in the compression stroke than in the working stroke the small end of the connecting rod bears, as will appear from Figs. 5 and 6, with the smaller inner surface 31 on the gudgeon pin 2 during the compression stroke (Fig. 6), while during the working stroke it bears with its outer bearing surface on the larger bearing surface 28 of the brass 26 (Fig. 5). The invention is not limited to the shown constructions, which are only given by way of examples, it being possible e. g. to arrange the various sets of bearing surfaces in other ways than here shown.

I claim:

1. An improvement in pistons, especially trunk pistons for two-stroke cycle internal combustion engines, characterized in that in connection with the piston a plurality of cylindrical bearing surfaces for the small end of the connecting rod are formed e. g. on the gudgeon pin or its bosses, which bearing surfaces are so shaped or arranged relatively to each other that the brasses or bearing surfaces of the small end of the connecting rod bear alternately on varying ones of the said cylindrical surfaces during the piston strokes.

2. An improvement according to claim 1 characterized in that the cylindrical bearing surfaces for the small end of the connecting rod are so shaped that the swinging out of the connecting rod to one side causes one set of bearing surfaces to coact, while its swinging out to the other side causes the other set of bearing surfaces to coact, and that the bearing surfaces being inactive at any moment are so separated as to give free access for the lubricant.

3. An improvement according to claim 1 characterized in that the axes of some of the cylindrical bearing surfaces of the piston for the small end of the connecting rod (e. g. on the gudgeon pin or on the bearings) are eccentrically placed relatively to the axes of others of the said bearing surfaces.

4. An improvement according to claim 1 characterized by a gudgeon pin 2 coacting with one or more bearing surfaces 31 in the bore 30 of the small end of the connecting rod and a brass 26 or the like placed in the piston and coacting with one or more cylindrically turned outer surfaces on the small end of the connecting rod.

5. An improvement according to claim 1 characterized by a gudgeon pin having several mutually eccentrically placed cylindrical bearing surfaces.

6. An improvement according to claim 1 characterized by a sleeve 5 or the like loosely mounted on the gudgeon pin non-rotatable relatively to the piston, the said sleeve or the like being provided with a plurality of cylindrical bearing surfaces eccentrically placed relatively to each other.

7. An improvement according to claim 1 characterized in that the bearing surface on the gudgeon pin or sleeve which is coaxial with the gudgeon pin is surrounded with a slight clearance by the corresponding brasses 14, 141 of the small end of the connecting rod.

8. An improvement according to claim 1 characterized in that the set of bearing surfaces which bears during the downstroke of the piston is essentially larger than the set of bearing surfaces which bears during the upstroke of the piston.

9. An improvement according to claim 1 characterized in that only a portion of the bearing surfaces for the small end of the connecting rod are formed on the sleeve 5 or the like, another portion thereof being formed by the outer surfaces of the gudgeon pin bearings 3, 4.

10. An improvement according to claim 1 characterized in that the bearing surfaces 20 on the sleeve 5 or the like lie eccentrically in relation to the bearing surfaces formed on the gudgeon pin bearings.

11. In a piston construction, a piston rod, a gudgeon pin therefor provided with a plurality of bearing bosses of different diameters on the gudgeon pin, bearing brasses in the piston rod for said bosses, some of said bosses having their cylindrical surfaces eccentrically disposed as regards the surfaces of the other bosses, whereby pressure is exerted alternately on said surfaces during the stroke of the piston.

In testimony whereof I affix my signature.

EINAR SØLVER.